(12) United States Patent
Sumiuchi et al.

(10) Patent No.: US 10,873,660 B2
(45) Date of Patent: Dec. 22, 2020

(54) CONTROL METHOD

(71) Applicant: CANON KABUSHIKI KAISHA, Tokyo (JP)

(72) Inventors: Kazuyoshi Sumiuchi, Kawasaki (JP); Mitsuru Konji, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 146 days.

(21) Appl. No.: 15/880,423

(22) Filed: Jan. 25, 2018

(65) Prior Publication Data
US 2018/0219845 A1 Aug. 2, 2018

(30) Foreign Application Priority Data
Jan. 31, 2017 (JP) ................... 2017-016206

(51) Int. Cl.
*H04L 29/06* (2006.01)
*H04M 1/725* (2006.01)
*H04W 4/80* (2018.01)
*G06F 3/12* (2006.01)
*H04W 12/06* (2009.01)
*G06F 3/0484* (2013.01)

(52) U.S. Cl.
CPC ........ *H04M 1/7253* (2013.01); *G06F 3/1292* (2013.01); *H04L 63/08* (2013.01); *H04W 4/80* (2018.02); *H04W 12/06* (2013.01); *G06F 3/04842* (2013.01); *H04M 2250/04* (2013.01)

(58) Field of Classification Search
CPC ........ G06F 3/1292; H04L 63/08; H04W 4/80; H04W 12/06
See application file for complete search history.

(56) References Cited

U.S. PATENT DOCUMENTS

| | | | |
|---|---|---|---|
| 8,810,669 B2* | 8/2014 | Aizawa ............... | H04L 12/2809 348/211.2 |
| 9,344,588 B2* | 5/2016 | Kimura .............. | H04N 1/00209 |
| 10,149,266 B2* | 12/2018 | Sakamoto ............... | H04L 69/08 |
| 2004/0054783 A1* | 3/2004 | Takemura .............. | H04N 5/765 709/227 |

(Continued)

FOREIGN PATENT DOCUMENTS

| | | |
|---|---|---|
| CN | 101030960 A | 9/2007 |
| CN | 102196592 A | 9/2011 |

(Continued)

*Primary Examiner* — Khang Do
(74) *Attorney, Agent, or Firm* — Canon U.S.A., Inc., IP Division

(57) ABSTRACT

A control method includes receiving, from a user through a screen displayed on a display unit by using a first program, an execution instruction to execute authentication processing for authenticating communication by a first wireless communication unit between a communication apparatus and an information processing apparatus, in a case where the execution instruction is received, displaying on the display unit by using a second program a setting screen for receiving from a user an input for selecting a target communication apparatus for the authentication processing from a plurality of communication apparatuses, and displaying on the display unit a notification region for notifying a user of information regarding an operation to be executed on the setting screen displayed on the display unit.

19 Claims, 10 Drawing Sheets

(56) References Cited

U.S. PATENT DOCUMENTS

| | | | |
|---|---|---|---|
| 2008/0168554 A1* | 7/2008 | Kim | G06F 21/608 |
| | | | 726/18 |
| 2009/0273803 A1* | 11/2009 | Sugimura | G06F 3/1204 |
| | | | 358/1.15 |
| 2011/0018754 A1* | 1/2011 | Tojima | G08O 23/04 |
| | | | 341/176 |
| 2011/0228328 A1* | 9/2011 | Sugimoto | G06F 9/542 |
| | | | 358/1.15 |
| 2012/0002222 A1* | 1/2012 | Ohara | G06F 3/1285 |
| | | | 358/1.9 |
| 2012/0099566 A1 | 4/2012 | Laine | |
| 2012/0154128 A1* | 6/2012 | Cho | G05B 15/02 |
| | | | 340/12.5 |
| 2012/0311452 A1* | 12/2012 | Takano | G06F 9/4411 |
| | | | 715/738 |
| 2014/0153018 A1* | 6/2014 | Mitsui | H04N 1/4413 |
| | | | 358/1.13 |
| 2014/0173686 A1* | 6/2014 | Kgil | H04L 63/205 |
| | | | 726/1 |
| 2014/0256250 A1* | 9/2014 | Cueto | H04B 5/0031 |
| | | | 455/41.1 |
| 2014/0368865 A1 | 12/2014 | Gutnik | |
| 2015/0036185 A1* | 2/2015 | Asai | H04N 1/00413 |
| | | | 358/1.15 |
| 2015/0189023 A1* | 7/2015 | Kubota | G06F 3/1292 |
| | | | 455/7 |
| 2015/0244878 A1* | 8/2015 | MacAuley | G06Q 30/0207 |
| | | | 358/1.2 |
| 2016/0019007 A1* | 1/2016 | Kurihara | H04N 1/00214 |
| | | | 358/1.15 |
| 2016/0227596 A1* | 8/2016 | Otani | H04N 5/23206 |
| 2016/0278151 A1* | 9/2016 | Kwon | H04W 76/14 |
| 2016/0286344 A1* | 9/2016 | Terashita | H04W 4/80 |
| 2017/0039012 A1* | 2/2017 | Minegishi | H04L 63/107 |
| 2017/0094091 A1* | 3/2017 | Urakawa | H04L 51/24 |
| 2017/0102903 A1* | 4/2017 | Nagasawa | G06F 3/1236 |
| 2017/0192723 A1* | 7/2017 | Ichikawa | H04W 12/08 |
| 2017/0201931 A1* | 7/2017 | Swanzey | H04L 63/0869 |
| 2017/0250974 A1* | 8/2017 | Antonyraj | H04L 63/0428 |
| 2017/0310848 A1* | 10/2017 | Iwahara | G06F 3/1204 |
| 2018/0060005 A1* | 3/2018 | Ueno | G06F 3/121 |
| 2018/0075679 A1* | 3/2018 | Niroomand | E05B 47/026 |
| 2018/0101342 A1* | 4/2018 | Riveiro | G06F 3/1226 |
| 2018/0103229 A1* | 4/2018 | Yang | H04N 5/4403 |
| 2018/0213478 A1* | 7/2018 | Baron | H04L 67/18 |
| 2018/0349076 A1* | 12/2018 | Hayashi | B41J 29/38 |

FOREIGN PATENT DOCUMENTS

| | | |
|---|---|---|
| CN | 102938939 A | 2/2013 |
| CN | 103890748 A | 6/2014 |
| JP | 2006-229360 A | 8/2006 |
| JP | 2012-084032 A | 4/2012 |
| JP | 2012-213905 A | 11/2012 |
| JP | 2012-227818 A | 11/2012 |
| JP | 2013-218397 A | 10/2013 |
| JP | 2016-110339 A | 6/2016 |
| JP | 2016-144025 A | 8/2016 |
| JP | 2016-164620 A | 9/2016 |
| JP | 2017-10329 A | 1/2017 |
| JP | 2018-124778 A | 8/2018 |

* cited by examiner

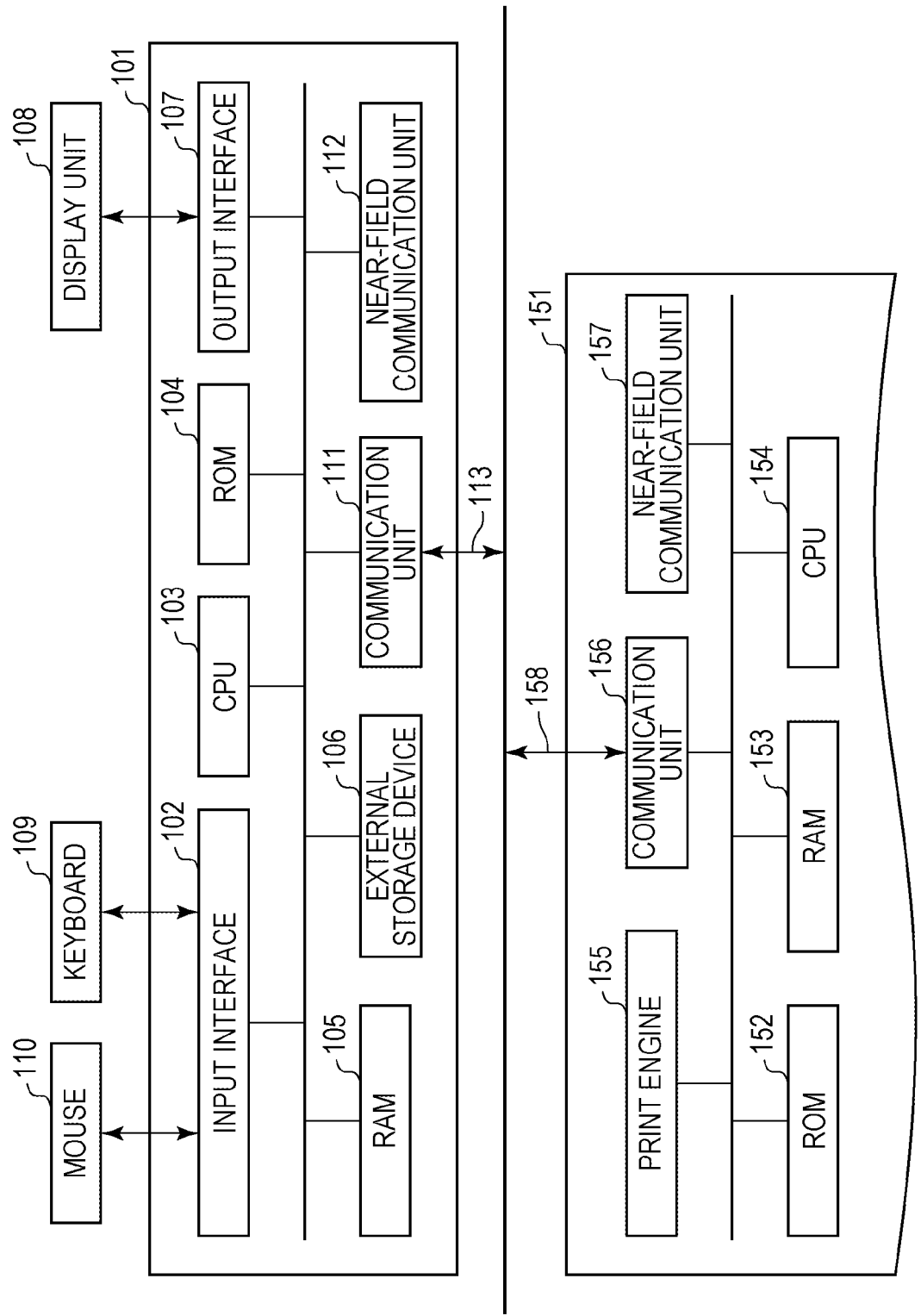

CONTROL METHOD

BACKGROUND OF THE INVENTION

Field of the Invention

The present invention relates to a control method.

Description of the Related Art

An information processing apparatus has been known which may communicate with a communication apparatus such as a printer by using a predetermined application (hereinafter, called an "app") such as a printing app. Such an information processing apparatus may execute pairing processing for performing authentication between the communication apparatus and the apparatus for highly secured communication. Japanese Patent Laid-Open No. 2017-10329 discloses an information processing apparatus which performs pairing processing with a communication apparatus by Bluetooth Low Energy (BLE).

Pairing processing may be performed before communication by a predetermined app, as described above. Accordingly, in order to perform pairing processing before communication by a predetermined app, the information processing apparatus may first receive an instruction to execute pairing processing on a screen displayed by the predetermined app. However, a user may sometimes execute input processing for the pairing processing on a screen displayed by a program of an app other than the predetermined app rather than a screen displayed by a program of the predetermined app. In other words, though the instruction to execute pairing processing is received on a screen displayed by the predetermined app, the input processing for executing the pairing processing may sometimes be executed on a screen displayed by a program of an app other than the predetermined app. Disadvantageously with this configuration, for input processing during pairing processing for communication by a predetermined app, a user may not easily determine an operation to be performed on a screen displayed by a program of an app other than the predetermined app.

Accordingly, the present invention may improve user operability in a configuration that an instruction to execute the pairing processing is given on a screen displayed by a predetermined app but an input operation for pairing processing is performed on a screen displayed by a program of an app other than the predetermined app.

SUMMARY OF THE INVENTION

Accordingly, there is provided a control method for an information processing apparatus according to an aspect of the present invention. The information processing apparatus has a first program and a second program different from the first program, and a first wireless communication unit configured to execute communication by a first wireless communication method and a second wireless communication unit configured to execute communication by a second wireless communication method having a higher communication speed than that of the first wireless communication method. The control method includes receiving, from a user through a screen displayed on a display unit by using the first program, an execution instruction to execute authentication processing for authenticating communication by the first wireless communication unit between a communication apparatus and the information processing apparatus, in a case where the execution instruction is received, displaying on the display unit by using the second program a setting screen for receiving from a user an input for selecting a target communication apparatus for the authentication processing from a plurality of communication apparatuses, and displaying on the display unit a notification region for notifying a user of information regarding an operation to be executed on the setting screen displayed on the display unit.

Further features of the present invention will become apparent from the following description of exemplary embodiments with reference to the attached drawings.

BRIEF DESCRIPTION OF THE DRAWINGS

FIG. 1 exemplarily illustrates configurations of an information processing apparatus and a communication apparatus.

DESCRIPTION OF THE EMBODIMENTS

Figure 2A:
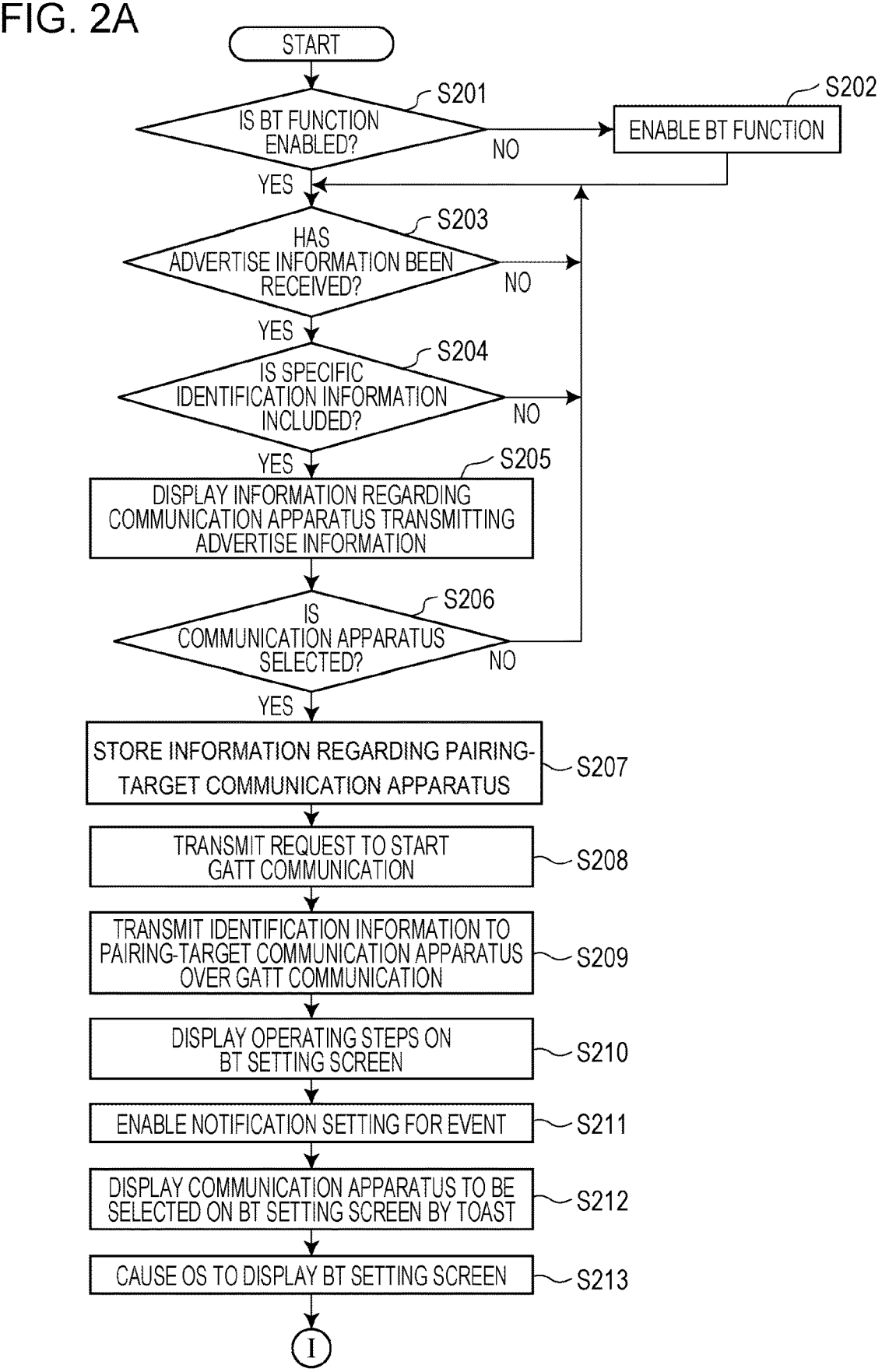
FIGS. 2A and 2B are flowcharts illustrating pairing processing to be executed by an information processing apparatus.

With reference to drawings, exemplary embodiments of the present invention will be described below. It should be understood that changes, modifications and alterations made to the following embodiments as required are encompassed in the scope of the present invention based on general knowledge of the person skilled in the art without departing from the spirit and scope of the present invention.

First Embodiment

An information processing apparatus and a communication apparatus included in a communication system according to a first embodiment will be described. Though a smartphone is applied as an example of the information processing apparatus according to this embodiment, embodiments of the present invention are not limited thereto. The information processing apparatus may be any of various apparatuses such as a mobile terminal, a desktop personal computer (PC), a tablet terminal, a personal digital assistant (PDA), and a digital camera. Though a printer is applied as an example of the communication apparatus according to this embodiment, embodiments of the present invention are not limited thereto. The communication may be any of various devices which can perform wireless communication with the information processing apparatus. For example, any printer is applicable such as an ink-jet printer, a full-color laser beam printer, and a monochromatic printer. Embodiments of the present invention are also applicable to not only such printers but also a copy machine, a facsimile apparatus, a mobile terminal, a smartphone, a laptop PC, a tablet terminal, a PDA, a digital camera, an audio player, a television and so on. Additionally, embodiments of the present invention are also applicable to a multi-function peripheral having a plurality of functions such as a copy function, a facsimile function and a printing function.

First, configurations of an information processing apparatus according to this embodiment and a communication apparatus capable of communicating with the information processing apparatus according to this embodiment will be described with reference to a block diagram illustrated in FIG. 1. This embodiment is applicable to any apparatuses which can communicate with a communication apparatus, and it is not intended to be particularly limited by the illustrated capabilities though the following configurations will be described below according to this embodiment, for example.

An information processing apparatus 101 corresponds to the information processing apparatus according to this embodiment. The information processing apparatus 101 may have an input interface 102, a CPU 103, a ROM 104, a RAM 105, an external storage device 106, an output interface 107, a display unit 108, a communication unit 111, and a near-field communication unit 112.

The input interface 102 is an interface configured to receive a data input or an operation instruction from a user by operating a mouse 110 or a keyboard 109.

The CPU 103 is a system control unit and is configured to generally control the information processing apparatus 101.

The ROM 104 is configured to store fixed data of a control program, a data table, an embedded operating system (hereinafter, called an OS) program to be executed by the CPU 103, for example. According to this embodiment, control programs stored in the ROM 104 are configured to implement software execution control over scheduling, task switching, interrupt processing and so on under management of the embedded OS stored in the ROM 104.

The RAM 105 may be a Static Random Access Memory (SRAM) which may require backup power supply. Because the RAM 105 may hold data with power from a primary battery for data backup, not illustrated, the RAM 105 may store important data such as program control variables without volatizing them. The RAM 105 may further has a memory area configured to store, for example, setting information for the information processing apparatus 101 and management data for the information processing apparatus 101. The RAM 105 may be used as a main memory and a work memory for the CPU 103.

The external storage device 106 is configured to store an application providing a print execution function and a print job generation program which generates a print job interpretable by the communication apparatus 151. The external storage device 106 is further configured to store a program such as an information transmission/reception control program which may perform transmission/reception to/from the communication apparatus 151 connected thereto through the communication unit 111 and information to be used by the programs.

The output interface 107 is an interface configured to control for display of data on the display unit 108 and notification of a state of the information processing apparatus 101.

The display unit 108 may be a light emitting diode (LED) or a liquid crystal display device (LCD), for example, and is configured to display data and notify a state of the information processing apparatus 101. Operating elements such as a numeral input key, a mode setting key, a determination key, a cancel key, and a power key may be provided on the display unit 108 to receive an input from a user through the display unit 108.

The communication unit 111 is connected to the communication apparatus 151, an external apparatus to the information processing apparatus 101, and an apparatus at an external access point (not illustrated) present externally to the communication apparatus 151 and is configured to execute data communication with them. For example, the communication unit 111 is connectable to an access point (not illustrated) within the communication apparatus 151. Connection between the communication unit 111 and an access point within the communication apparatus 151 enables mutual communication between the information processing apparatus 101 and the communication apparatus 151. It should be noted that the communication unit 111 may communicate with the communication apparatus 151 directly by wireless communication or through an external apparatus present externally to the information processing apparatus 101 and the communication apparatus 151. The term "external apparatus" here refers to an external access point or a non-access point apparatus which can relay communication. A wireless communication method such as Wi-Fi (Wireless Fidelity) (registered trademark) and a Bluetooth (registered trademark) may be used. The external access point may be an apparatus such as a wireless LAN router. According to this embodiment, the information processing apparatus 101 and the communication apparatus 151 may be directly connected without through an external access point in a direct connection method. The information processing apparatus 101 and the communication apparatus 151 may be connected through an external access point in an infrastructure connection method.

The near-field communication unit 112 is configured to execute data communication in near-field connection with an apparatus such as the communication apparatus 151 and to communicate with the communication unit 111 based on a different communication method. The near-field communication unit 112 is connectable with the near-field communication unit 157 within the communication apparatus 151, for example. A communication method such as Bluetooth (registered trademark) and WiFi Aware may be applied therefor. This embodiment assumes that the near-field communication unit 112 has a Bluetooth function which enables execution of communication based on Bluetooth Low Energy (BLE) and Bluetooth Classic.

According to this embodiment, the communication unit 111 is configured to be able to perform communication at a higher speed than that of the near-field communication unit 112. It is assumed here that a communicable distance of the communication unit 111 is longer than a communicable distance of the near-field communication unit 112.

The communication apparatus 151 corresponds to the communication apparatus of this embodiment. The communication apparatus 151 may have a ROM 152, a RAM 153, a CPU 154, a print engine 155, a communication unit 156, and a near-field communication unit 157.

The communication unit 156 has an access point for connecting with an apparatus such as the information processing apparatus 101 as an internal access point in the communication apparatus 151. The access point is connectable with the communication unit 111 in the information processing apparatus 101. It should be noted that the communication unit 156 may communicate with the information processing apparatus 101 directly by wireless communication or through an external access point. A communication method such as Wi-Fi (registered trademark) and a Bluetooth (registered trademark) may be used. The communication unit 156 may include hardware functioning as an access point or may operate as an access point by software for causing the communication unit 156 to function as an access point.

The near-field communication unit 157 is configured to execute near-field connection with an apparatus such as the information processing apparatus 101 and to be able to connect with the near-field communication unit 112 within the information processing apparatus 101, for example. A communication method such as Bluetooth (registered trademark) and WiFi Aware may be applied therefor. This embodiment assumes that the near-field communication unit 157 has a Bluetooth function which enables execution of communication based on Bluetooth Low Energy (BLE) and Bluetooth Classic.

According to this embodiment, the communication unit 156 is configured to be able to perform communication at a higher speed than that of the near-field communication unit 157. It is assumed here that a communicable distance of the communication unit 156 is longer than a communicable distance of the near-field communication unit 157.

The RAM 153 may be an SRAM which may require backup power supply. Because the RAM 153 may hold data with power from a primary battery for data backup, not illustrated, the RAM 153 may store important data such as program control variables without volatizing them. The RAM 153 may further have a memory area configured to store, for example, setting information for the communication apparatus 151 and management data for the communication apparatus 151. The RAM 153 may be used as a main memory and a work memory for the CPU 154 and may store information such as information in a reception buffer for temporarily storing print information received from the information processing apparatus 101, for example.

The ROM 152 is configured to store fixed data of a control program, a data table, and an OS program to be executed by the CPU 154, for example. According to this embodiment, control programs stored in the ROM 152 are configured to implement software execution control over scheduling, task switching, interrupt processing and so on under management of the embedded OS stored in the ROM 152.

The CPU 154 is a system control unit and is configured to generally control the communication apparatus 151.

The print engine 155 is configured to perform image formation processing and output a print result. The image formation processing applies a recording material such as ink onto a recording medium such as paper based on information stored in the RAM 153 or a print job received from the information processing apparatus 101, for example, to form an image on the recording medium. The term "print job" here refers to a job for causing the communication apparatus 151 to perform the image formation processing. In this case, because the print job transmitted from the information processing apparatus 101, for example, has a large transmission data amount and requires high speed communication, the print job is received through the communication unit 156 capable of communicating at a higher speed than that of the near-field communication unit 157.

A memory device such as an external hard disk drive (HDD) and an SD card may optionally be provided in the communication apparatus 151, and information to be stored in the communication apparatus 151 may be stored in the memory device.

The communication apparatus according to this embodiment has a connection mode set by connection setting processing and communicates with the information processing apparatus based on the connection configuration based on the set connection mode. In order for the communication apparatus according to this embodiment to perform communication by the infrastructure connection, the connection mode is set to an infrastructure connection mode. In order to perform communication by the direct connection, the connection mode is set to a direct connection mode.

Having described above how processes are to be divided between the information processing apparatus 101 and the communication apparatus 151, for example, the division is not limited to thereto. Processes may be divided therebetween in any manner.

This embodiment assumes that the near-field communication unit 112 and the near-field communication unit 157 perform communication by BLE. According to this embodiment, the near-field communication unit 157 functions as an advertiser (or slave) which broadcasts advertise information, which will be described below, and the near-field communication unit 112 functions as a scanner (or master) which receives the advertise information. This embodiment further assumes that the communication unit 111 and the communication unit 156 perform communication over a wireless LAN (Wi-Fi). Next, with reference to FIG. 8, processing for transmitting advertise information and receiving BLE connection request under BLE standards will be described. According to this embodiment, because the near-field communication unit 157 operates as a slave device as described above, the near-field communication unit 157 is assumed to perform the processing as described above.

Figure 8:
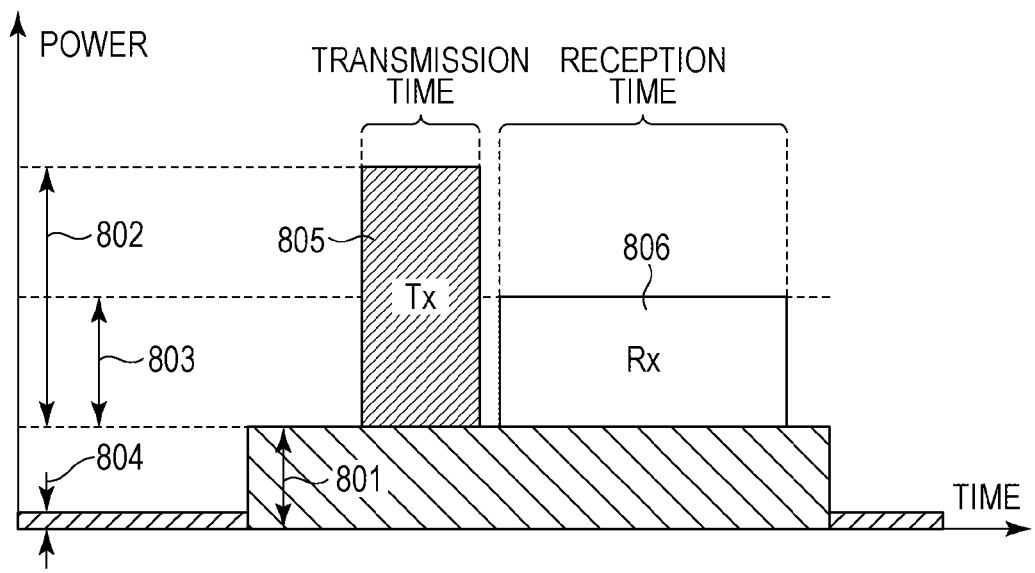
FIG. 8 illustrates processing for broadcasting advertise information and receiving connection request information.

The near-field communication unit 157 divides a frequency band of 2.4 GHz into 40 channels (0 to 39 ch) for communication based on the BLE communication method. The near-field communication unit 157 uses 37th to 39th channels among them for transmission of advertise information and reception of BLE connection requests and 0th to 36th channels for data communication (such as GATT communication) after a BLE connection. FIG. 8 illustrates a vertical axis indicating power consumption by the near-field communication unit 157 and a horizontal axis indicating time period and illustrates a power consumption for transmitting advertise information by using one channel for each process. FIG. 8 further illustrates a total power consumption Tx805 in a transmission process in processing for broadcasting advertise information and a total power consumption Rx806 in a reception process in processing for enabling a receiver configured to receive a BLE connection request. Referring to FIG. 8, a transmission power 802 indicates an instantaneous power consumption by a transmission process. A reception power 803 indicates an instantaneous power consumption by a reception process. A microcomputer operating power 801 indicates an instantaneous power consumption when a microcomputer within the near-field communication unit 157 operates. The microcomputer operates before and after and during Tx805 and Rx806 because the microcomputer is required to be activated in advance for executing and terminating transmission and reception processes. Transmission of advertise information by using a plurality of channels results in an increased power consumption for the increased number of channels used for the advertise information transmission. During a period when the microcomputer is not operating and the near-field communication unit 157 has a power saving mode, the instantaneous power consumption of the near-field communication unit 157 is equal to a sleep power 804. In this manner, the near-field communication unit 157 may use a predetermined channel to perform a transmission process and then use the same channel to perform a reception process for a predetermined period of time so that the near-field communication unit 157 can wait for a BLE connection request transmitted from the information processing apparatus 101. When the near-field communication unit 157 receives a BLE connection request from the information processing apparatus 101, the near-field communication unit 157 establishes a BLE connection and thus perform GATT communication with the information processing apparatus 101.

Figure 9:
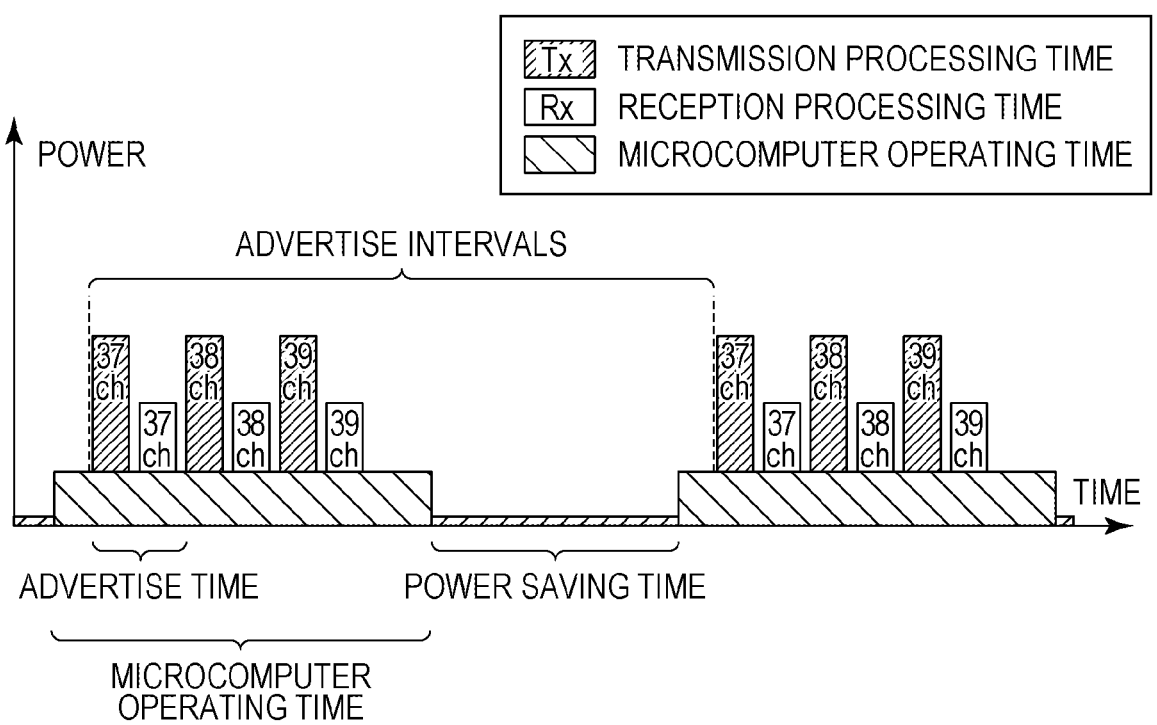
FIG. 9 illustrates advertise by BLE.

The near-field communication unit 157 may repeat the advertise information transmission and reception processes three times by using different channels as illustrated in FIG. 9, terminate the operation of the microcomputer, and may then be shifted to have a power saving mode for a predetermined period of time. Hereinafter, a combination of advertise information transmission and reception processes by using a predetermined channel will be called an advertise. A time interval for transmitting advertise information by using a predetermined channel will be called an advertising cycle. The number of advertises to be repeated during a period from the first advertise to the shift to the power saving mode may arbitrarily be changed if it is equal to or lower than three.

Figure 10:
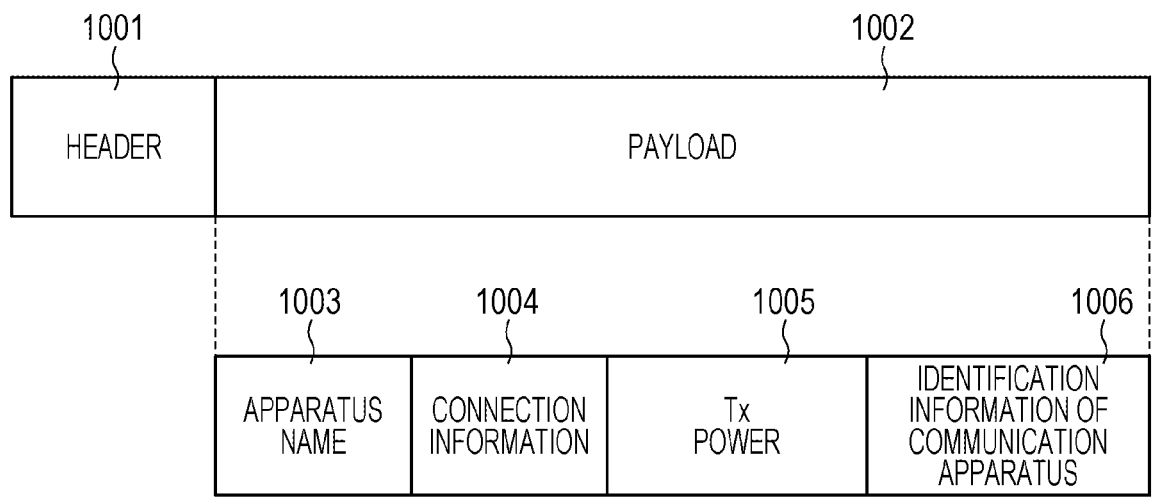
FIG. 10 illustrates a structure of advertise information.

FIG. 10 illustrates an example structure of advertise information to be broadcasted from the near-field communication unit 157 to neighborhood of the communication apparatus 151.

The near-field communication unit 157 may perform initialization processing upon start of power supply and shift to have an advertising state. The near-field communication unit 157 having the advertising state periodically broadcasts advertise information to the neighborhood based on an advertising cycle. The term "advertise information" refers to a signal including basic header information (such as identification information for identifying a destination apparatus of the advertise information) and having a header 1001 and a payload 1002. The information processing apparatus 101 receiving the advertise information can identify the presence of the communication apparatus 151. The information processing apparatus 101 may transmit a BLE connection request to the communication apparatus 151 to execute BLE connection with the communication apparatus 151. The header 1001 is a region for storing the type of advertise information and information regarding the size of the payload 1002. The payload 1002 may store a device name 1003 or mounted profile information as the identification information, connection information 1004 for BLE connection with the communication apparatus 151, and information regarding transmission power (Tx Power) 1005 for advertise information. The advertise information may include identification information 1006 of a communication apparatus. The identification information 1006 of a communication apparatus corresponds to a MAC address of the communication apparatus, service information of the communication apparatus, an SSID of or a password for an access point within the communication apparatus.

According to this embodiment, the near-field communication unit 157 shifts to an advertising state when the power supply to the communication apparatus 151 is turned on and starts transmission of advertise information. However, the time for starting transmission of advertise information by the near-field communication unit 157 is not limited thereto but may be a time when a predetermined operation is performed for enabling a BLE function, for example.

For example, the near-field communication unit 157 may first transmit first advertise information and, when receiving a response to the first advertise information from the information processing apparatus 101, may transmit second advertise information containing different data from that of the first advertise information. For example, the first advertise information may include information regarding transmission power for advertise information and identification information of the near-field communication unit 157. The second advertise information may include identification information of the communication apparatus 151 and information regarding a function and hardware included in the communication apparatus 151. In this configuration, for example, an app for printing (hereinafter, a printing app) may be designed to handle the second advertise information. Therefore, the following description assumes that advertise information to be handled by the printing app is the second advertise information.

According to this embodiment, pairing processing is performed which performs an authentication process between the information processing apparatus 101 and the communication apparatus 151 for reading and writing data by GATT (Generic Attribute Profile) communication between the apparatuses. GATT is a profile for reading and writing (transmission and reception) of information under BLE standards. In a GATT communication, the information processing apparatus 101 may function as a GATT client, and the communication apparatus 151 may function as a GATT server. A GATT-based profile enables reading and writing information from the information processing apparatus 101 to the communication apparatus 151 in the communication. It is configured that, when the pairing between the information processing apparatus 101 and the communication apparatus 151 is not executed, the communication apparatus 151 does not allow reading and writing of information by GATT communication. This can prevent communication between the information processing apparatus 101 and the communication apparatus 151 which are unpaired and thus prevent unintentional acquisition of information held by the communication apparatus 151 to the unpaired information processing apparatus 101. This embodiment assumes that there are GATT communication to be permitted between unpaired apparatuses and GATT communication not to be permitted between unpaired apparatuses. It may be configured to allow communication of less confidential information by the GATT communication to be permitted between unpaired apparatus for improved convenience of communication. On the other hand, it may be configured to allow communication of highly confidential information by the GATT communication not to be permitted between unpaired apparatuses for improved security of communication.

This embodiment assumes that the information processing apparatus 101 stores a predetermined application in the ROM 104 and the external storage device 106, for example. The predetermined application may be an application program, for example, for transmission to the communication apparatus 151 of a print job for printing image data or document data within the information processing apparatus 101. Hereinafter, an application having such a function will be called a printing app. The printing app may include other functions in addition to the print function. For example, in a case where the communication apparatus 151 may have a scan function, the printing app may include a function for scanning a document set on the communication apparatus 151, a function for defining a setting for the communication apparatus 151, and a function for checking the state of the communication apparatus 151. In other words, the printing app may have a function for transmitting a scan job or a setting job in addition to the print job to the communication apparatus 151. The predetermined application is not limited to the printing app but may be an application program having a function other than printing.

The information processing apparatus 101 may sometimes communicate with the communication apparatus 151 by BLE, for example, in order to use a function of the printing app. More specifically, for example, in order to execute the print function, the information processing apparatus 101 may first exchange, by BLE communication, connection information regarding WiFi communication and then transmit a print job to the communication apparatus 151 by WiFi communication. Accordingly, in order to use a function of the printing app, the information processing apparatus 101 may execute pairing processing for BLE to be able to execute BLE communication with the communication apparatus 151. This embodiment assumes that the printing app also has a function for performing pairing processing between the information processing apparatus 101 and the communication apparatus 151. The pairing processing to executed through the printing app will be described below.

Figure 3:
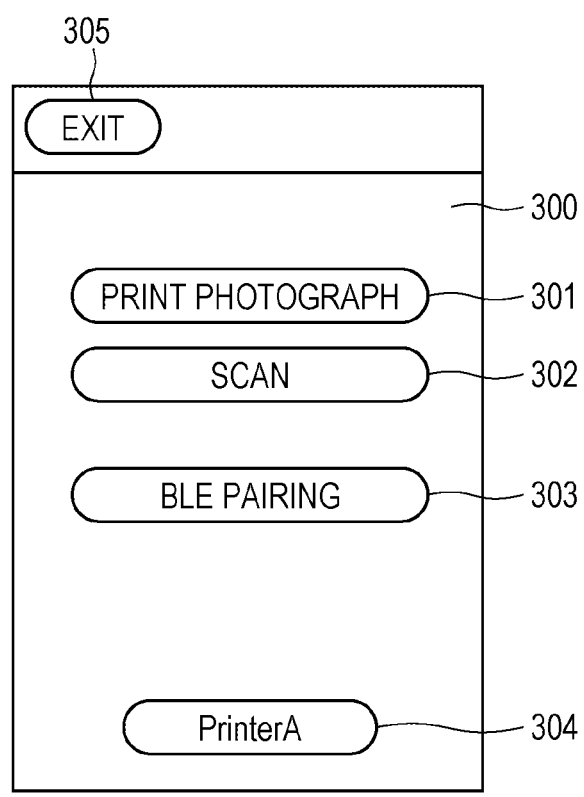
FIG. 3 illustrates an example screen to be displayed on a display unit in the information processing apparatus upon activation of an app for printing.

FIG. 3 illustrates an example screen to be displayed on the display unit 108 when the printing app is activated. Through a start-up screen 300, a user may use a function of the communication apparatus such as printing of a desired image and defining a setting for the communication apparatus. When the information processing apparatus 101 detects a press of a "PRINT PHOTOGRAPH" button 301, the information processing apparatus 101 causes the communication apparatus 151 to display a screen for executing printing. When the information processing apparatus 101 detects a press of a "SCAN" button 302, the information processing apparatus 101 causes the communication apparatus 151 to display a screen for executing scan processing which is processing for scanning a document to generate image data. When the information processing apparatus 101 detects a press of a BLE PARING button 303, the information processing apparatus 101 starts pairing processing.

It is assumed that the information processing apparatus 101 according to this embodiment has an application for setting (hereinafter, a setting app). The setting app is an application program for defining a setting relating to a function to be executed by the OS. The setting app may be installed during a series of processing operations for installing the OS in the information processing apparatus 101 or may be installed in the information processing apparatus 101 in advance together with the OS upon arrival of the information processing apparatus 101. In order to perform pairing with the communication apparatus 151, the information processing apparatus 101 according to this embodiment receives from a user an input for the pairing on a Bluetooth setting screen (hereinafter, BT setting screen) displayed by the setting app. More specifically, the information processing apparatus 101 receives from a user an input for pairing on the BT setting screen displayed by the setting app. This is because pairing processing may not be executed on a screen displayed by a program other than the setting app, that is, the printing app because of, for example, some types of OS installed in the information processing apparatus 101 or some models of the information processing apparatus 101. Accordingly, the information processing apparatus 101 also uses the BT setting screen displayed by the setting app for performing pairing processing through the printing app. A configuration will be described which performs pairing processing on both of a screen displayed by the printing app and a screen displayed by a program (setting app, here) other than the printing app according to this embodiment for improved usability.

Figure 2B:
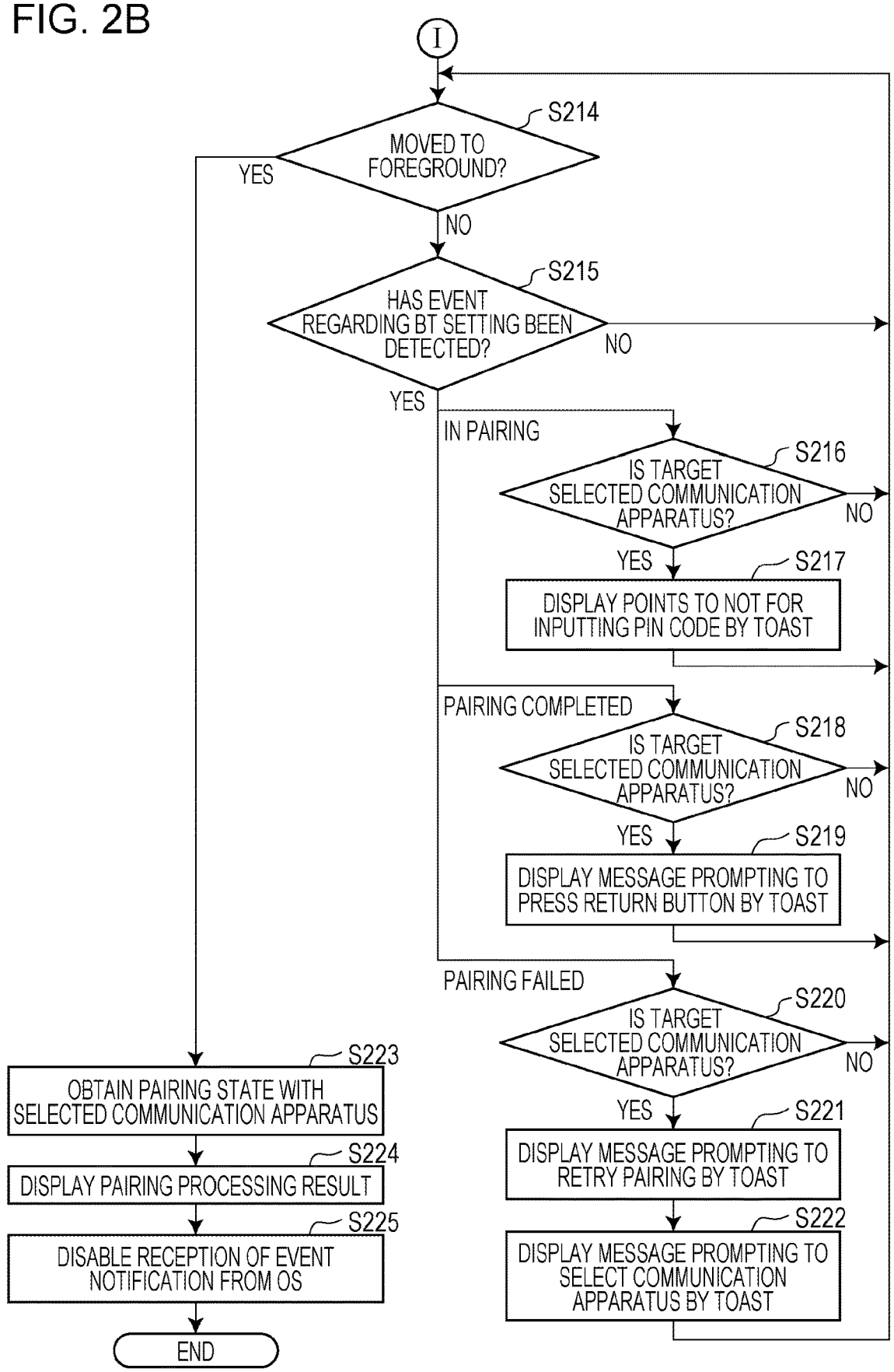

FIGS. 2A and 2B are flowcharts illustrating pairing processing to be executed by the information processing apparatus 101. The flowcharts illustrated in FIGS. 2A and 2B may be implemented by a program stored in the ROM 104 or the external storage device 106 and invoked to the RAM 105 and executed by the CPU 103, for example. According to this embodiment, the processing illustrated in the flowcharts in FIGS. 2A and 2B is assumed to be executed by the printing app. According to this embodiment, it is assumed that the printing app is configured to be able to receive a notification that an event such as "in pairing", "pairing completed", and "pairing failed" has occurred through a BT setting screen displayed by the setting app. Whether the printing app is to actually receive a notification of occurrence of such an event or not may be defined in notification settings, which will be described below. Details of those events will be described below. The processing illustrated in the flowcharts in FIGS. 2A and 2B is assumed to start when the BLE PARING button 303 is pressed by a user.

First in S201, the CPU 103 determines whether a Bluetooth function of the information processing apparatus 101 is enabled or not. With the enabled Bluetooth function, the information processing apparatus 101 is ready for execution of communication by Bluetooth or BLE. As described above, the near-field communication unit 112 operates as a scanner under the BLE communication standard. Thus, when the information processing apparatus 101 is ready for execution of communication by BLE, the CPU 103 shifts the near-field communication unit 112 to a state ready for receiving advertise information (scan state) and searches advertise information. If the CPU 103 determines that the Bluetooth function is enabled, the processing moves to S203. If the CPU 103 determines that the Bluetooth function is not enabled (or is disabled), the processing moves to S202.

In S202, the CPU 103 enables the disabled Bluetooth function. In this case, the CPU 103 displays on the display unit 108 a dialog for prompting a user to select whether the Bluetooth function is to be enabled or not. If the CPU 103 receives an instruction from the user through the dialog, the Bluetooth function may be enabled.

Next in S203, the CPU 103 determines whether the near-field communication unit 112 has received advertise information after the BLE PARING button 303 is pressed. If the CPU 103 determines that advertise information has been received, the processing moves to S204. If the CPU 103 determines that the advertise information has not been received, the CPU 103 after a predetermined waiting time performs the processing S203 again for waiting for reception of the advertise information.

Next in S204, the CPU 103 determines whether the received advertise information includes specific identification information or not. According to this embodiment, in order to perform pairing processing through the printing app, the information processing apparatus 101 is configured to communicate with a communication apparatus of the model or vendor supporting the printing app. Therefore, the specific identification information is identification information indicating that the communication apparatus having transmitted the received advertise information is a communication apparatus of the model supporting the printing app or a communication apparatus provided by a predetermined vendor supporting the printing app. More specifically, the specific identification information may be information indicating that the communication apparatus having transmitted the received advertise information can provide a print service (image formation function) or information regarding the name of model or vendor of the communication apparatus having transmitted the received advertise information. The identification information may be any information by which a communication apparatus supporting the printing app can be uniquely identified and may be an IP address, a MAC address, or an ID information, for example. If the CPU 103 determines that the received advertise information includes the specific identification information, the processing moves to S205. If the CPU 103 determines that the received advertise information does not include the specific identification information, the CPU 103 after a predetermined waiting time performs the processing S203 again for waiting for reception of the advertise information. In a case where the near-field communication unit 112 receives a plurality of advertise information pieces after a press of the BLE PARING button 303 is detected, the CPU 103 performs the determination in S204 with respect to each of the advertise information pieces. If the CPU 103 determines that at least one of the advertise information pieces includes the specific identification information, the processing moves to S205.

In S205, the CPU 103 displays on the display unit 108 information regarding the communication apparatus having transmitted the advertise information including the specific identification information. The information regarding the communication apparatus may be included in the advertise information including the specific identification information and may be information such as a name, an IP address, or a MAC address, for example, of the communication apparatus. In a case where a plurality of advertise information pieces each including the specific identification information is received, the CPU 103 displays information regarding the communication apparatuses having transmitted the advertise information pieces. The information regarding the communication apparatus having transmitted the advertise information including the specific identification information may be displayed on a screen for prompting a user to select a target communication apparatus of the pairing processing. In other words, the printing app displays a screen for prompting a user to select a target communication apparatus of the pairing processing. Because of the filtering performed in S204, the information regarding the communication apparatus which supports the printing app (or on which the printing app can execute a function) is displayed, and information regarding a communication apparatus which does not support the printing app is not displayed.

Next in S206, through the screen displayed in S205, the CPU 103 determines whether a selection of a target communication apparatus of the pairing processing has been received from a user or not. More specifically, the CPU 103 determines whether any one of information pieces regarding communication apparatuses included in the screen displayed in S205 has been selected or not. If the CPU 103 determines that the selection has been received from a user, the processing moves to S207. If the CPU 103 determines that no selection has been received from a user, the CPU 103 performs the processing in S206 again and waits for a selection from a user. If the CPU 103 determines that no selection has been received from a user, the processing in and after S203 may be performed again with the screen for prompting a user to select a target communication apparatus of the pairing processing kept displayed on the display unit 108. Thus, information regarding the transmission source of newly received advertise information can be added to the screen for prompting a user to select a target communication apparatus of the pairing processing. If the CPU 103 determines that a selection has been received from a user, the CPU 103 determines that an instruction to execute the pairing processing has been received from a user, and determines the communication apparatus corresponding to the selected information as the pairing target communication apparatus. It is assumed here that the communication apparatus having a name "PrinterA" has been selected by a user, for the following descriptions.

In S207, the CPU 103 stores the information regarding the pairing target communication apparatus in a predetermined storage region in the external storage device 106 or the ROM 104, for example. The information regarding the pairing target communication apparatus may be advertise information transmitted by the pairing target communication apparatus, for example.

Next in S208, the CPU 103 requests the pairing target communication apparatus to start GATT communication based on the information stored in S207. Thus, information which can be communicated without pairing can undergo GATT communication between the information processing apparatus 101 and the pairing target communication apparatus.

Next in S209, the CPU 103 transmits by GATT communication the identification information regarding the information processing apparatus 101 to the pairing target communication apparatus. In this case, the CPU 103 transmits the identification information by GATT communication permitted without performing pairing. More specifically, the CPU 103 writes the identification information in a region writable without performing pairing in a GATT profile in the pairing target communication apparatus. The identification information regarding the information processing apparatus 101 may be information such as a name, an IP address, or a MAC address of the information processing apparatus 101, for example. If the CPU 103 successfully transmits the identification information, the CPU 103 ends the GATT communication. The processing then moves to S210. Here, the CPU 103 may repeat the transmission of the identification information until the identification information is transmitted successfully. Alternatively, until the successful transmission, a dialog, for example, may be displayed on the display unit 108 to receive an interrupt of processing, or a timeout may cause after a lapse of a predetermined time period to interrupt the processing.

If the pairing target communication apparatus receives the identification information transmitted from the information processing apparatus 101 by GATT communication, the pairing target communication apparatus may store it in a storage region in the pairing target communication apparatus. The pairing target communication apparatus may receive a pairing processing request only while the identification information is being stored in the storage region. The pairing target communication apparatus may receive a pairing processing request only from an information processing apparatus corresponding to the identification information stored in the storage region. Thus, the pairing target communication apparatus may be controlled to receive a pairing processing request only when the pairing processing is executed through the printing app. The pairing target communication apparatus may determine whether the pairing processing has completed or not and whether a predetermined time period has passed from the storing of the identification information or not. If one of the determinations results in YES, the identification information is deleted from the storage region.

It is to be understood that the processing to be executed by the pairing target communication apparatus for receiving a pairing processing request is not limited to the configuration as described above. For example, the pairing target communication apparatus may be configured to receive identification information from the information processing apparatus 101 after receiving a pairing processing request from the information processing apparatus 101. In this case, after the pairing target communication apparatus receives a pairing processing request from the information processing apparatus 101, the pairing target communication apparatus determines whether the identification information received from the information processing apparatus 101 is matched with the information regarding the information processing apparatus 101 included in the pairing processing request or not. If they are matched, the pairing target communication apparatus accepts the pairing processing request and starts the pairing processing. If not, the pairing target communication apparatus does not accept the pairing processing request and does not start the pairing processing.

Figure 7:
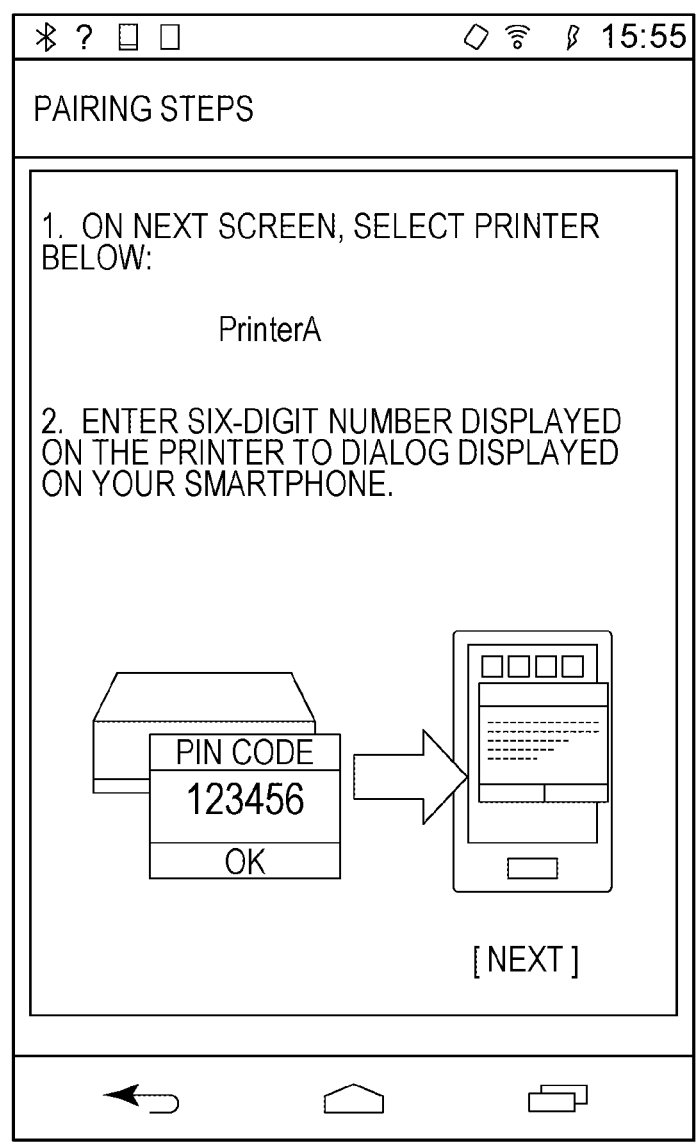
FIG. 7 illustrates an example screen illustrating operating steps to be performed by a user on a BT setting screen and a name of a communication apparatus to be selected on the BT setting screen.

Next in S210, the CPU 103 displays on the display unit 108 a screen displaying operation steps to be performed by a user in the pairing processing. According to this embodiment, as described above, operations for the pairing processing such as an input of information for pairing is performed on a BT setting screen of the setting app running on the information processing apparatus 101. Accordingly, in S208, the CPU 103 may display on the display unit 108 dialogs illustrating operation steps to be performed by a user on the BT setting screen and a communication apparatus to be selected on the BT setting screen. The CPU 103 further displays a button for receiving an instruction to move to the next step from a user. More specifically, for example, the CPU 103 in S210 may display a screen as illustrated in FIG. 7. In S210, if the CPU 103 detects that an instruction to move to the next step is received from a user, the CPU 103 closes the dialog displayed on the display unit 108. The processing then moves to S211.

Next in S211, the CPU 103 enables a notification setting for an event to the printing app. More specifically, the CPU 103 sets to enable the printing app to receive a notification of an event occurring in response to an operation performed on the BT setting screen displayed by the setting app. Thus, the printing app can recognize occurrence of an event such as "in pairing", "pairing completed", or "pairing failed" based on an operation performed on the BT setting screen and can execute predefined processing in response to occurrence of the event.

Next in S212, the CPU 103 displays a Toast showing a message prompting a user to select, on the BT setting screen displayed on the display unit 108 in S211, the communication apparatus selected by the user through the screen displayed in S205. In other words, the CPU 103 here displays a Toast showing a message prompting a user to select the communication apparatus having the name "PrinterA" on the BT setting screen. The Toast displayed here is kept being displayed in front of the BT setting screen even when the BT setting screen is displayed, which will be described below. In other words, because a user can select a communication apparatus on the BT setting screen by checking the message displayed in a Toast, the user can quickly and accurately grasp which communication apparatus is to be selected on the BT setting screen.

The term "Toast" refers to a notification region to be pop-up displayed in the foreground on the display unit 108 in the information processing apparatus 101. A Toast is automatically hidden after a lapse of a predetermined period of time. A Toast may be displayed on a partial region of a display unit though it is not limited in size to prevent it from completely covering a screen displayed by the printing app and the BT setting screen. Even while a Toast is being displayed, a region excluding the Toast may be operated to execute an operation on the screen displayed behind the Toast, minimizing interference with user operations. In order to display a Toast by using the communication apparatus selected by the user through the screen displayed in S205, the CPU 103 transmits a request to display a Toast to the OS along with data of a message to be included in the Toast because the OS has a function for displaying a Toast. Thus, the CPU 103 can display the Toast by using the printing app. The CPU 103 can display a Toast even when a program requesting to display the Toast is moved to the background. A state that a program is moved to the background corresponds to a state that a screen displayed by a program other than the program is being displayed on the display unit 108 while the program is kept running. On the other hand, a state that a program is moved to the foreground corresponds to a state that a screen displayed by the program is being displayed on the display unit 108 while the program is kept running.

In order to keep displaying a Toast for a long period of time, the CPU 103 may display again the Toast automatically hidden after a lapse of a predetermined period. In this case, the CPU 103 may repeat the re-display a predetermined number of times or until the Toast is hidden by a user operation.

Next in S213, the CPU 103 changes the screen to be displayed on the display unit 108 from a screen to be displayed by the printing app to a BT setting screen to be displayed by the setting app. Then, the CPU 103 moves the printing app to the background. More specifically, the CPU 103 displays the screen to be displayed by the setting app on the display unit 108 in response to an instruction from the printing app by keeping the printing app active. The configuration has been described up to this point which changes the screen to be displayed by the display unit 108 from the screen as illustrated in FIG. 7 to the BT setting screen. Embodiments of the present invention are not limited to the configuration, but, for example, it may be configured that the screen as illustrated in FIG. 3 is changed from the screen as illustrated in FIG. 3 directly to the BT setting screen after receiving an instruction to execute the pairing processing.

Figure 4A:
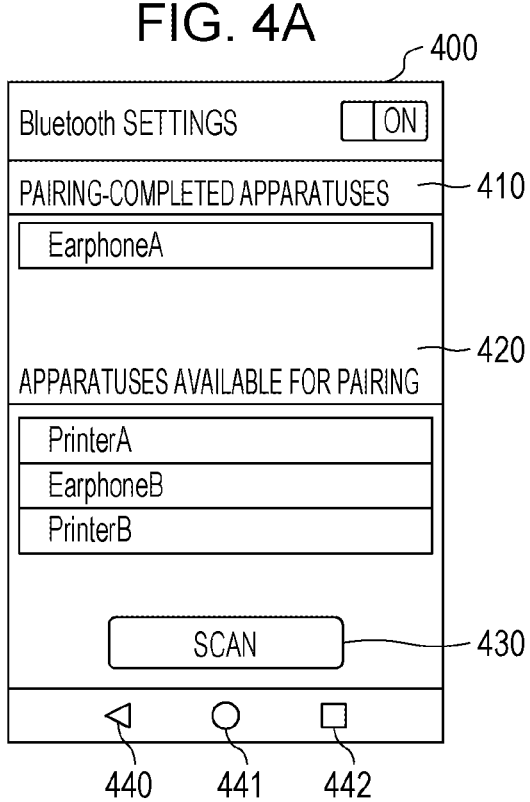
FIGS. 4A to 4C illustrate example BT setting screens to be displayed by an app for setting.
Figure 4B:
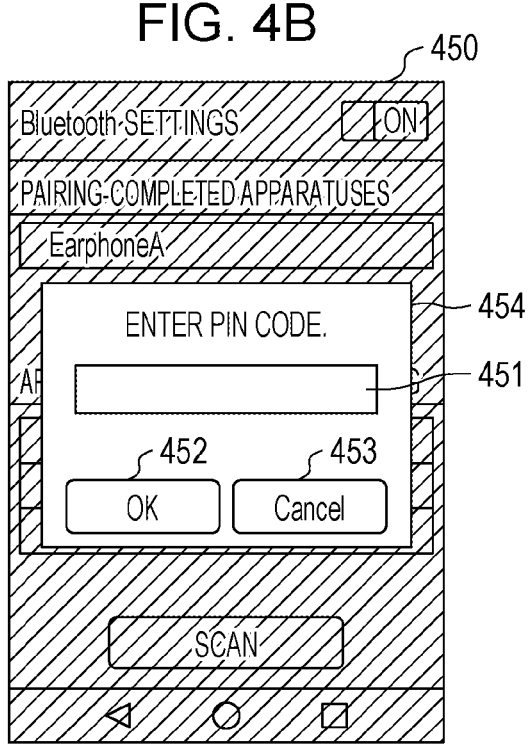
Figure 4C:
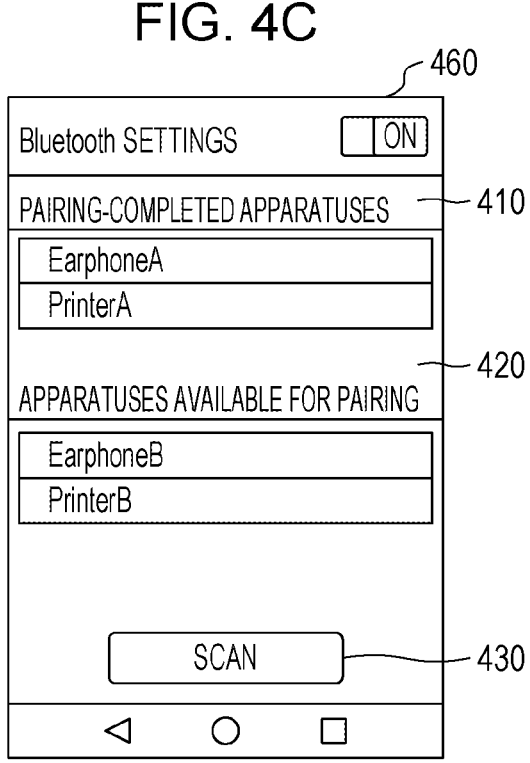

FIGS. 4A to 4C are examples of the BT setting screen to be displayed by the setting app. On the BT setting screen, a setting for a Bluetooth function of the information processing apparatus 101 can be defined. More specifically, the BT setting screen is a screen for receiving from a user a selection of a communication apparatus to be paired with the information processing apparatus 101, for example.

First, the CPU 103 displays a BT setting screen 400 illustrated in FIG. 4A on the display unit 108. The BT setting screen displays a list of pairing-completed devices 410, a list of devices available for pairing 420, and a SCAN button 430.

The list of pairing-completed devices 410 is a region displaying information regarding a communication apparatus on which pairing processing with the information processing apparatus 101 has already been executed (or paired with the information processing apparatus 101).

The list of devices available for pairing 420 is a region displaying information regarding a communication apparatus with which the information processing apparatus 101 can execute the pairing processing. It is noted here that the expression "a communication apparatus with which the information processing apparatus 101" refers to a communication apparatus having transmitted advertise information received by the information processing apparatus 101. Filtering is not particularly performed on communication apparatuses displayed in the list of devices available for pairing 420. The list of devices available for pairing 420 may also display a communication apparatus not supporting the printing app (such as a non-printer apparatus and a printer not supporting the printing app instructing the pairing processing). A user may select one of communication apparatuses displayed in the list of devices available for pairing 420 so that the pairing processing with the selected communication apparatus can be started.

The SCAN button 430 is a button for causing the information processing apparatus 101 to starting searching (scanning) advertise information transmitted from a communication apparatus in a BLE-supported apparatus around the information processing apparatus 101 in order to update the data of the list of devices available for pairing 420.

A return button 440 is a button usable for displaying again the screen displayed on the display unit 108 immediately before the currently displayed screen. As described above, the BT setting screen 400 including the return button 440 is displayed by the setting app. In a case where the screen displayed immediately before the BT setting screen 400 is displayed by a program excluding the setting app, the screen displayed by the program excluding the setting app is displayed again in response to a press of the return button 440. According to this embodiment, because the screen displayed immediately before the BT setting screen 400 is a screen displayed by the printing app, the screen displayed by the printing app is displayed again in response to a press of the return button 440.

A home button 441 is a button usable for displaying a home screen to be displayed by the OS. The term "home screen" refers to a screen displaying icons for activating application programs (such as the printing app) included in the information processing apparatus 101, for example.

A task list button 442 is a button usable for displaying a screen for selecting a program to run in the foreground. Accordingly, when the printing app is selected on a screen displayed in response to a press of the task list button 442, a screen presented by the printing app is displayed again.

The CPU 103 in response to a press of the SCAN button 430 shifts the information processing apparatus 101 to a scanning state that is a state ready for receiving advertise information transmitted from a communication apparatus around the information processing apparatus 101. Next, if the CPU 103 receives advertise information, the CPU 103 identifies a name (Complete Local Name) of the communication apparatus having transmitted the advertise information included in the received advertise information. The CPU 103 then adds the identified name to the list of devices available for pairing 420, displays it, and updates the display data of the list of devices available for pairing 420.

It is assumed here that names of communication apparatuses displayed in the list of pairing-completed devices 410 and the list of devices available for pairing 420 are information included in the received advertise information. The advertise information may further include, in addition to names of communication apparatuses, identification information (Bluetooth device address: BD_ADDR) for identifying an individual near-field communication unit included in a communication apparatus having transmitted the advertise information. Therefore, the identification information may be displayed in the list of pairing-completed devices 410 and the list of devices available for pairing 420. The CPU 103 may store advertise information received from a communication apparatus displayed in the list of pairing-completed devices 410 or the list of devices available for pairing 420 in a storage region (such as the RAM 105 or the external storage device 106) in the information processing apparatus 101.

When a user selects one of communication apparatuses displayed in the list of devices available for pairing 420, pairing processing with the selected communication apparatus is started, as described above. However, again, the BT setting screen is a screen to be displayed by the setting app, and filtering for displaying a communication apparatus suitable for the printing app is not performed for displaying a candidate for the pairing target communication apparatus. As a result, the list of devices available for pairing 420 may display information regarding communication apparatuses excluding the communication apparatus selected by a user through the screen displayed in S205 or communication apparatuses not supporting the printing app because they do not have a print function, for example. This means that, disadvantageously, it is difficult for a user to determine which communication apparatus is to be selected as a target communication apparatus of the pairing processing through the printing app.

According to this embodiment, in a case where the display unit 108 displays the BT setting screen, the CPU 103 may display a Toast showing steps of user operations in front of the BT setting screen by the printing app. More specifically, for example, the CPU 103 may display a BT setting screen 600 illustrated in FIG. 6A displaying a Toast 601 in the foreground of the BT setting screen 400 illustrated in FIG. 4A. The Toast 601 displays a message prompting a user to select "PrinterA" that is the communication apparatus selected by the user on the screen displayed by the printing app in S205. This configuration can prevent misoperations and can improve user's convenience. It may be configured that the Toast displayed here may include information (name) of a communication apparatus supporting the printing app instead of the communication apparatus selected by a user on the screen displayed by the printing app in S205.

According to this embodiment, the Toast may first be displayed in S212, and the BT setting screen is then displayed in S213. However, embodiments of the present invention are not limited to the configuration. In other words, after the BT setting screen is displayed, the Toast may be displayed.

Next in S214, the CPU 103 determines whether the printing app on the background has been moved to the foreground or not. More specifically, the CPU 103 determines whether the screen displayed on the display unit 108 has been changed from the BT setting screen to a screen displayed by the printing app or not. Notably, for example, in a case where a screen displayed by the printing app is selected on the selection screen displayed in response to a press of the return button 440 or a press of the task list button 442, the printing app is moved to the foreground. If the CPU 103 determines that the printing app has been moved to the foreground, the processing moves to S223. If the CPU 103 determines that the printing app has not been moved to the foreground, the processing moves to S215.

Next in S215, the CPU 103 determines whether an event has been notified to the printing app through the BT setting screen displayed by the setting app or not. If the CPU 103 determines that the event has been notified, the following processing is performed based on the type of the notified event. More specifically, the CPU 103 determines that the notified event is "in pairing", the processing moves to S216. If the CPU 103 determines that the notified event is "pairing completed", the processing moves to S218. If the CPU 103 determines that the notified event is "pairing failed", the processing moves to S220. On the other hand, if the CPU 103 determines that no event has been notified, the processing in S214 is executed again.

Figure 5:
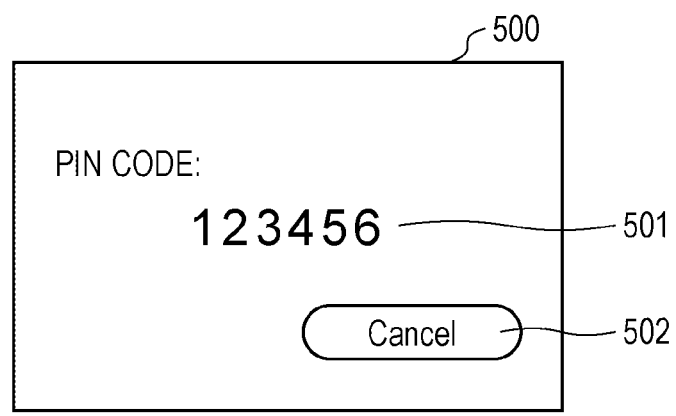
FIG. 5 is an example PIN code display screen to displayed on a display unit in a communication apparatus.

Next, details of the events will be described. The event indicating "in pairing" is an event that occurs when execution of the pairing processing is instructed through the BT setting screen 600. More specifically, the event indicating "in pairing" occurs when a user selects one of communication apparatuses displayed in the list of devices available for pairing 420. When execution of the pairing processing is instructed, the setting app reads out advertise information received from the communication apparatus selected by the user from a storage region and determines information such as identification information for the pairing processing from the read advertise information. The setting app then transmits a pairing request based on the determined information and the BLE communication standards to the communication apparatus selected by the user. The communication apparatus having received the pairing request displays a PIN code display screen 500 as illustrated in FIG. 5 on a display unit (not illustrated) that the communication apparatus has. The PIN code display screen 500 displays a PIN code 501 that is authentication information to be used for pairing processing and a Cancel button 502 to be sued for cancelling pairing processing.

When the setting app transmits a pairing request by causing an event indicating "in pairing", the display unit 108 displays a PIN code input screen 450 illustrated in FIG. 4B. The PIN code input screen 450 is a screen displaying a PIN code input dialog 454 in front of the BT setting screen 400 illustrated in FIG. 4A. The PIN code input dialog 454 displays a PIN code input region 451, an OK button 452, and a Cancel button 453. The PIN code input region 451 is a region for receiving a PIN code input by a user. The OK button 452 is a button for transmitting the input PIN code to the communication apparatus selected by the user. The Cancel button 453 is a button for cancelling pairing processing.

In some OS specifications, a fixed period may be defined in which the PIN code 501 can be input to the PIN code input region 451 (or in which the input can be successfully performed), for example. The period in which the PIN code 501 can be input to the PIN code input region 451 may be equal to 30 seconds, for example. In this case, if input of the PIN code 501 and press of the OK button 452 are not performed within 30 seconds from the time when the PIN code input screen 450 is displayed, the PIN code 501 is not transmitted to the communication apparatus selected by the user. This means that the pairing processing fails.

If the OK button 452 is pressed after the PIN code 501 is input to the PIN code input region 451 within the period, the setting app transmits information including the input PIN code 501 to the communication apparatus selected by the user. The communication apparatus selected by the user determines whether the PIN code 501 included in the received information is matched with the PIN code 501 (a PIN code corresponding to the communication apparatus) displayed on the PIN code display screen 500 or not. If the communication apparatus selected by the user determines that they are matched, the communication apparatus permits the information processing apparatus 101 to be paired. More specifically, the communication apparatus selected by the user transmits a link key generated by a predetermined method based on the PIN code 501 to the information processing apparatus 101 by using Security Manager Protocol (SMP) in the BLE standards. Then, the link key is stored in a storage region (such as the ROM 104) in the information processing apparatus 101 and a storage region (such as the ROM 152) in the communication apparatus selected by the user. Thus, the pairing completes, and execution of BLE communication is permitted between the information processing apparatus 101 and the communication apparatus. If the pairing processing completes (successfully), an event indicating "pairing completed" occurs.

When the pairing processing completes, the setting app displays the BT setting screen 460 illustrated in FIG. 4C which does not display the PIN code input dialog 454. Upon occurrence of the event indicating "pairing completed", the communication apparatus represented by "PrinterA" and the information processing apparatus 101 are completely paired. Therefore, the setting app adds "PrinterA" to the list of pairing-completed devices 410 and deletes "PrinterA" from the list of devices available for pairing 420.

On the other hand, if it is determined that the PIN code 501 included in the received information is not matched with the PIN code 501 displayed on the PIN code display screen 500, the pairing fails. Therefore, the communication apparatus selected by the user does not transmit the link key to the information processing apparatus 101. In this case, the communication apparatus selected by the user transmits information indicating that the pairing has failed to the information processing apparatus 101. When the pairing processing fails, the pairing processing may be executed again. Then, the setting app displays the BT setting screen 400 illustrated in FIG. 4A on the display unit 108 again. Pairing may fail without limiting to such a case where the PIN codes are not matched. For example, pairing fails if the Cancel button 453 is pressed on the PIN code input screen 450 in FIG. 4B or the Cancel button 502 is pressed on the PIN code display screen in FIG. 5. The pairing may fail if no input is performed for a long period of time on the PIN code input region 451, for example. In this manner, if the pairing processing fails, the event indicating "pairing failed" occurs.

Based on these configurations, the processing will be described with reference to FIGS. 2A and 2B.

In S216, the CPU 103 determines whether the communication apparatus selected on the BT setting screen 600 displayed by the setting app is matched with the communication apparatus selected on the screen displayed by the printing app in S205 or not. The notification of the event indicating "in pairing" includes identification information of the communication apparatus selected on the BT setting screen 600 displayed by the setting app. Therefore, more specifically, the CPU 103 may execute the determination processing by comparing the identification information included in the notification of the event indicating "in pairing" and the information stored in S207. If the CPU 103 determines that they are matched, the processing moves to S217. If not, the processing returns to S214. If the CPU 103 determines that they are not matched, the CPU 103 may display a Toast displaying that the communication apparatus selected on the BT setting screen 600 is not matched with the communication apparatus selected on the screen displayed in S205. Alternatively, the CPU 103 may display a Toast for prompting a user to abort the pairing processing with the communication apparatus selected on the BT setting screen 600, for example. The CPU 103 may display again the Toast indicating the communication apparatus selected on the screen displayed in S205, for example.

When the event indicating "in pairing" occurs, the setting app displays the PIN code input screen 450 illustrated in FIG. 4B on the display unit 108, as described above. In some OS specifications, as described above, a fixed period may be defined in which the PIN code 501 can be input to the PIN code input region 451 (or in which the input can be successfully performed), for example. Accordingly, the CPU 103 in S217 performs display control for displaying a Toast 603 including information regarding a period when the PIN code 501 can be successfully input in front of the PIN code input screen 450. As a result, the display unit 108 displays a BT setting screen 602 illustrated in FIG. 6B. More specifically, the Toast 603 may display a message for prompting to input the PIN code 501 within 30 seconds from display of the PIN code input screen 450 and the number of digits of the PIN code 501 to be input. Thus, a user may execute the corresponding operations based on things to be noted for inputting the PIN code 501, which can improve the usability in inputting the PIN code 501. The CPU 103 executes the processing in S214 again after S217.

In S218, the CPU 103 determines whether the communication apparatus having paired with the information processing apparatus 101 is matched with the communication apparatus selected on the screen displayed by the printing app in S205 or not. The notification of the event indicating "pairing completed" include identification information of the communication apparatus having paired with the information processing apparatus 101. Therefore, more specifically, the CPU 103 may execute the determination processing by comparing the identification information included in the notification of the event indicating "in pairing" and the information stored in S207. If the CPU 103 determines that they are matched, the processing moves to S219. If not, the processing returns to S214. If the CPU 103 determines that they are not matched, the CPU 103 may display a Toast displaying that the communication apparatus having paired with the information processing apparatus 101 is not matched with the communication apparatus selected on the screen displayed in S205.

When the event indicating "pairing completed" occurs, the setting app displays the BT setting screen 460 illustrated in FIG. 4C on the display unit 108. If the pairing processing normally (or successfully) completes (that is, if the communication apparatus having paired with the information processing apparatus 101 is matched with the communication apparatus selected on the screen displayed in S205), the screen to be displayed by the printing app may be displayed again. In other words, the return button 440 may be pressed to move the printing app to the foreground. Accordingly, in S219, the CPU 103 displays in front of the BT setting screen 460 a Toast 605 including a notification for moving the printing app to the foreground. As a result, the display unit 108 displays the BT setting screen 604 illustrated in FIG. 6C. More specifically, the Toast 605 displays an operating method (for prompting to press the return button 440) for moving the printing app to the foreground. Thus, a user can smoothly execute the operation for moving the printing app to the foreground. The CPU 103 executes the processing in S214 again after S219. Here, the CPU 103 may display a Toast presenting information indicating that the pairing processing has normally (or successfully) completed.

In S220, the CPU 103 determines whether the communication apparatus which has failed to be paired with the information processing apparatus 101 is matched with the communication apparatus selected on the screen displayed by the printing app in S205 or not. A notification of the event indicating "pairing failed" includes identification information of the communication apparatus failed to be paired with the information processing apparatus 101. Therefore, more specifically, the CPU 103 performs the determination processing by comparing identification information included in the notification of the event indicating "pairing failed" and the information stored in S207. If the CPU 103 determines that they are matched, the processing moves to S221. If not, the processing returns to S214. If the CPU 103 determines that they are not matched, the CPU 103 may display a Toast displaying that the communication apparatus having failed to be paired with the information processing apparatus 101 is not matched with the communication apparatus selected on the screen displayed in S205.

If the event indicating "pairing failed" occurs, the setting app displays again the BT setting screen 400 illustrated in FIG. 4A on the display unit 108 to execute the pairing processing again, as described above. In other words, a BT setting screen showing that pairing processing with the communication apparatus indicated by "PrinterA" has not completed is displayed. Accordingly, in S221, the CPU 103 displays in front of the BT setting screen 400 a Toast 607 including a notification prompting a user to execute the pairing processing again. As a result, the display unit 108 displays a BT setting screen 606 illustrated in FIG. 6D. More specifically, the Toast 607 displays a notification that the pairing has failed and an operating method for normally executing pairing processing (notifying an instruction to input a correct password within 30 seconds). Thus, a user can smoothly execute the pairing processing again even though the pairing processing has failed. The CPU 103 may include a notification of a cause of the failure of the pairing processing in the Toast 607.

Figure 6A:
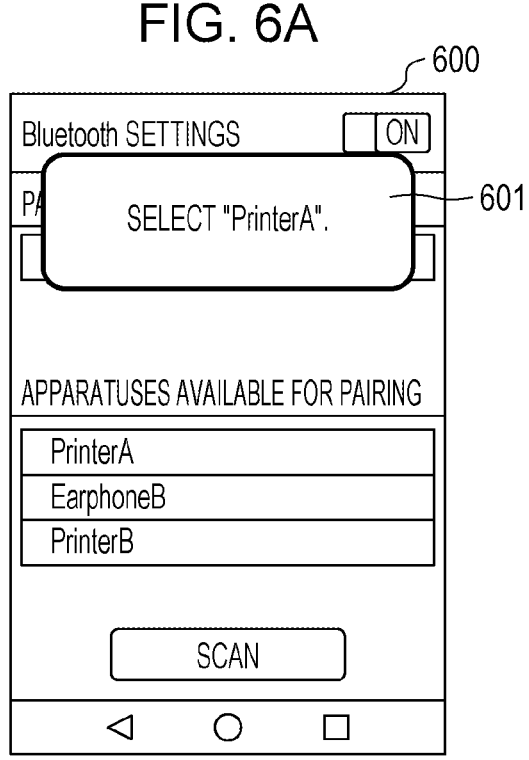
FIGS. 6A to 6D illustrate example BT setting screens to be displayed by the app for setting and example Toasts to be displayed by the app for printing.
Figure 6B:
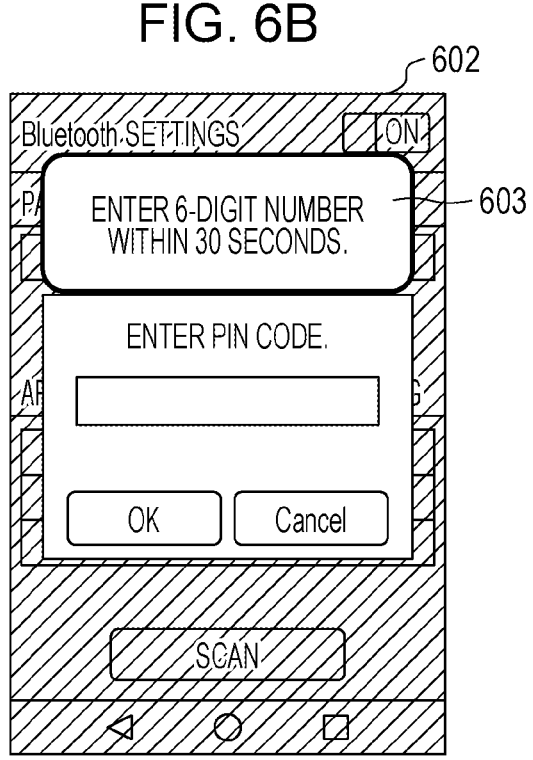
Figure 6C:
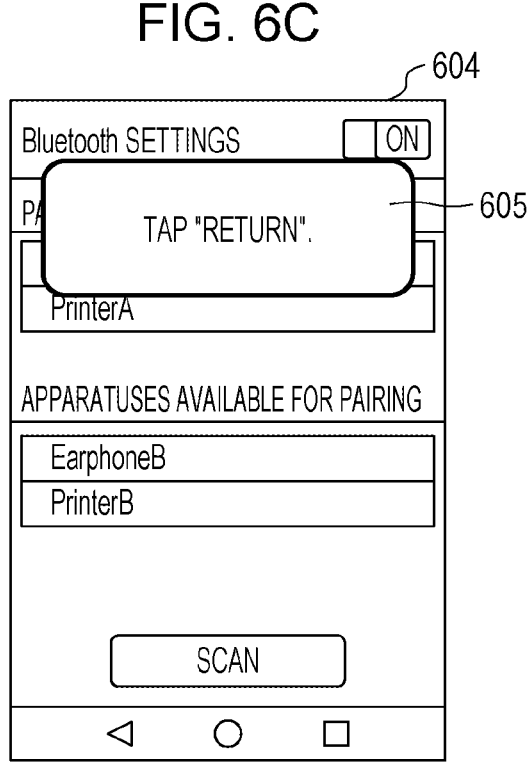
Figure 6D:
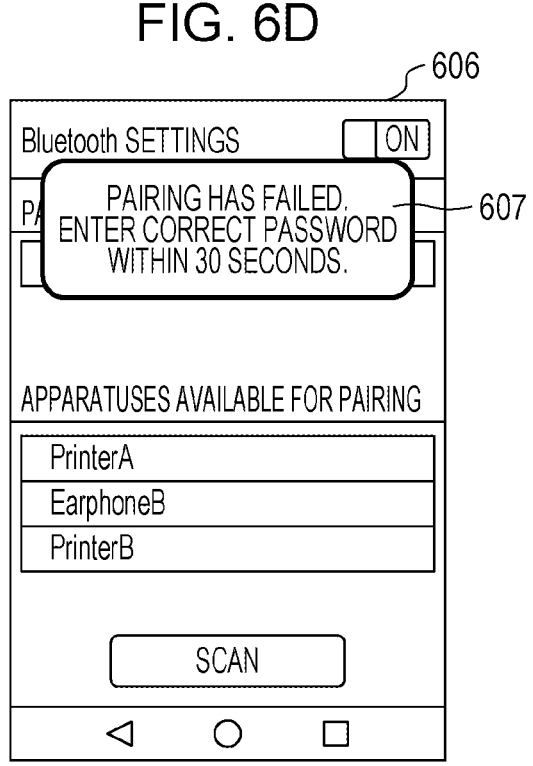

Next in S222, the CPU 103 displays a Toast 601 including a message prompting a user to select on the BT setting screen a communication apparatus selected by the user through the screen displayed in S205. As a result, the BT setting screen 600 illustrated in FIG. 6A is displayed on the display unit 108 again. Thus, a user can be notified again of which communication apparatus is to be selected. The CPU 103 after S222 executes the processing in S214 again.

In S223, the CPU 103 obtains from the OS information regarding the pairing state between the communication apparatus selected on the screen displayed by the printing app in S205 and the information processing apparatus 101. Thus, the CPU 103 can determine whether the pairing between the communication apparatus selected on the screen displayed by the printing app in S205 and the information processing apparatus 101 has completed or not. The method for the determination is not limited thereto. For example, the CPU 103 may store in advance an event indicating "pairing completed" and an event indicating "pairing failed" received through the setting app, for example. Then, the CPU 103 may determine whether the pairing between the communication apparatus and the information processing apparatus 101 has completed or not based on the stored events.

Next in S224, the CPU 103 displays a Toast or a dialog on the display unit 108 based on the result of the determination in S223. Because the display unit 108 currently displays a screen provided by the printing app, the CPU 103 displays a Toast or a dialog in front of the screen. If the CPU 103 determines that the pairing between the communication apparatus selected on the screen displayed by the printing app in S205 and the information processing apparatus 101 has completed, a Toast or dialog including a message indicating that the pairing processing has completed is displayed. If the CPU 103 determines that the pairing between the communication apparatus selected on the screen displayed by the printing app in S205 and the information processing apparatus 101 has not completed, a Toast or dialog including a message indicating that the pairing processing has failed is displayed. If the pairing processing has failed, the processing from S204 may be performed again to execute the pairing processing again.

Next in S225, the CPU 103 sets to prevent the printing app from receiving a notification of an event caused by an operation performed on the BT setting screen displayed by the setting app. Thus, the printing app can receive a notification of an event only during the pairing processing through the BT setting screen displayed by the setting app and displays a Toast based on the occurring event. Thus, a notification with a Toast can be performed at an any appropriate time.

After that, the CPU 103 ends the processing. Here, because the display unit 108 displays a screen provided by the printing app, the CPU 103 may continuously execute a function that the printing app has in accordance with a user instruction. For example, the CPU 103 may execute setting processing relating to connectivity between the paired communication apparatus and information processing apparatus 101 through BLE or may transmit a print job to the paired communication apparatus. With this configuration, a user can continuously use the printing app also after the pairing processing ends.

According to this embodiment, in a case where pairing processing is to be performed by using a BT setting screen displayed by the setting app to implement BLE communication by the printing app, the printing app displays a Toast including various kinds of information on the BT setting screen. With this configuration, an operation to be executed on the BT setting screen based on data input on a screen displayed by the printing app can be presented on a BT setting screen displayed by the setting app, which can improve user convenience. For example, an operation to be executed on the BT setting screen displayed by the setting app to use the printing app may be presented on the BT setting screen displayed by the setting app, which can improve user convenience. It can further prevent a user from performing a misoperation on the BT setting screen displayed by the setting app, which can further improve convenience.

OTHER EMBODIMENTS

Having described that, according to the aforementioned embodiment, the BT setting screen is displayed by the setting app, the program for displaying the BT setting screen is not limited to the setting app. The present invention is applicable to any configuration in which the BT setting screen is displayed by at least a program other than the printing app.

Having described that, according to the aforementioned embodiment, a Toast is displayed for notifying a user of an operating method on the setting screen, embodiments of the present invention is not limited thereto. For example, a notification region called a balloon may be used to notify a user of an operating method on the setting screen.

The present invention can be implemented by processing implemented by a program implementing one or more functions of the aforementioned embodiment, which is supplied to a system or an apparatus over a network or through a storage medium and read and executed by one or more processors in the system or the apparatus. The present invention may also be implemented by a circuit (such as ASIC) implementing the one or more functions.

According to the present invention, input processing for executing pairing processing may be performed on a screen displayed by a program other than a predetermined app through execution of the pairing processing is instructed through a screen displayed by the predetermined app, which can improve user operability.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-016206, filed Jan. 31, 2017, which is hereby incorporated by reference herein in its entirety.

What is claimed is:

1. A control method for an information processing apparatus, the information processing apparatus having
   a first program and a second program different from the first program; and
   a first wireless communication unit configured to execute communication by a first wireless communication method and a second wireless communication unit configured to execute communication by a second wireless communication method having a higher communication speed than that of the first wireless communication method, the control method comprising:
   receiving, from a user through a screen displayed on a display unit by using the first program, an execution instruction to execute authentication processing for authenticating communication by the first wireless communication unit between a communication apparatus and the information processing apparatus;

in a case where the execution instruction is received, displaying on the display unit by using the second program a setting screen for receiving from the user an input for selecting a target communication apparatus from a plurality of communication apparatuses for authenticating communication by the first wireless communication unit between the target communication apparatus and the information processing apparatus; and displaying, by using the first program a notification region for notifying the user of information regarding an operation to be executed on the setting screen displayed on the display unit by using the second program, the notification region being displayed on the setting screen displayed on the display unit by using the second program.

2. The control method according to claim 1, wherein the notification region is a notification region for prompting the user to select on the setting screen a communication apparatus supporting the first program as the target communication apparatus.

3. The control method according to claim 1,
wherein, in a case where the input for selecting the target communication apparatus from the plurality of communication apparatuses is received from the user on the setting screen, an input region for receiving an input of authentication information to be used is displayed on the display unit; and
wherein the authentication information input in the input region is transmitted to the target communication apparatus.

4. The control method according to claim 3,
wherein the notification region is a notification region to be displayed in a case where the input region is displayed on the display unit and presents information regarding a period for successfully inputting the authentication information; and
wherein, in a case where the input of the authentication information is received within the period for successfully inputting the authentication information, the authentication information is transmitted to the target communication apparatus, but, in a case where the input of the authentication information is not received within the period for successfully inputting the authentication information, the authentication information is not transmitted to the target communication apparatus.

5. The control method according to claim 4, further comprising, in a case where the input of the authentication information is not received within the period for successfully inputting the authentication information, performing control to display on the display unit a notification region indicating that the authentication processing has failed and the setting screen concurrently.

6. The control method according to claim 3, further comprising, in a case where the authentication information transmitted to the target communication apparatus is not the authentication information corresponding to the target communication apparatus, performing control to display on the display unit a notification region indicating that the authentication processing has failed and the setting screen concurrently.

7. The control method according to claim 3, further comprising, in a case where the authentication information transmitted to the target communication apparatus is the authentication information corresponding to the target communication apparatus, performing control to display on the display unit a notification region indicating that the authentication processing has succeeded and the setting screen concurrently.

8. The control method according to claim 3, wherein the notification region is a notification region to be displayed in a case where the authentication information transmitted to the target communication apparatus is the authentication information corresponding to the target communication apparatus for prompting a user to change a screen displayed on the display unit from the setting screen to a screen to be displayed by the first program.

9. The control method according to claim 3, wherein in a case where the input for selecting a target communication apparatus from the plurality of communication apparatuses is received from the user on the setting screen, the authentication information corresponding to the target communication apparatus is displayed on a display unit included in the target communication apparatus.

10. The control method according to claim 1, further comprising:
in a case where the screen displayed on the display unit is changed from the setting screen to a screen displayed by the first program and where authentication processing completes for authenticating between the target communication apparatus and the information processing apparatus by the first program, displaying a notification region indicating that the authentication processing has completed on the display unit; and
in a case where the screen displayed by the display unit is changed from the setting screen to the screen displayed by the first program and the authentication processing has not completed for authenticating between the target communication apparatus and the information processing apparatus by the first program, displaying a notification region indicating that the authentication processing has not completed on the display unit.

11. The control method according to claim 1, further comprising:
displaying on the display unit by using the first program a reception screen for receiving from the user an input for selecting a communication apparatus from communication apparatuses supporting the first program before the setting screen is displayed,
wherein the notification region is a notification region for prompting to select a communication apparatus based on the input received on the reception screen as the target communication apparatus.

12. The control method according to claim 11, wherein the communication apparatus supporting the first program is a communication apparatus operable of executing a predetermined function supporting the first program.

13. The control method according to claim 11, wherein the communication apparatus supporting the first program is a communication apparatus operable of executing an image formation function for forming an image by using a recording agent on a recording medium.

14. The control method according to claim 11, wherein the communication apparatus supporting the first program is a communication apparatus provided by a predetermined vendor.

15. The control method according to claim 1, wherein the first program is an application program for transmitting to the communication apparatus a print job causing the communication apparatus to execute image formation processing forming an image by using a recording agent on a recording medium.

16. The control method according to claim 1, wherein the second program is an application program installed in the information processing apparatus in advance upon arrival of the information processing apparatus.

17. The control method according to claim 1, wherein, in a case where the instruction to execute the authentication processing is received from the user through a first screen of screens displayed on the display unit by using the first program, the screen displayed on the display unit is changed from a second screen of the screens displayed on the display unit by using the first program to the setting screen.

18. The control method according to claim 1, wherein, after the notification region is displayed on the setting screen, the notification region having a content different from a content of the notification region already displayed on the setting screen is displayed on the display unit in accordance with an operation executed on the setting screen.

19. The control method according to claim 1, further comprising:
- obtaining, by the first wireless communication unit, information for communication by the second wireless communication unit after the authentication processing is completed; and
- executing communication by the second wireless communication unit after information for communication by the second wireless communication unit is obtained.

* * * * *